No. 754,735. PATENTED MAR. 15, 1904.
F. A. ANTHONY.
FLEXIBLE PHOTOGRAPHIC FILM.
APPLICATION FILED APR. 16, 1903.
NO MODEL.

Witnesses
Inventor
Frederick A. Anthony
By his Attorney
Phillips Abbott.

THE NORRIS PETERS CO., PHOTO-LITHO., WASHINGTON, D. C.

No. 754,735. Patented March 15, 1904.

UNITED STATES PATENT OFFICE.

FREDERICK A. ANTHONY, OF HACKENSACK, NEW JERSEY.

FLEXIBLE PHOTOGRAPHIC FILM.

SPECIFICATION forming part of Letters Patent No. 754,735, dated March 15, 1904.

Application filed April 16, 1903. Serial No. 152,830. (No model.)

*To all whom it may concern:*

Be it known that I, FREDERICK A. ANTHONY, a citizen of the United States, and a resident of Hackensack, county of Bergen, State of New Jersey, have invented a new and useful Improvement in Flexible Photographic Films, of which the following is a full, clear, and exact description, reference being had to the accompanying drawings, in which—

Figure 1:
Figure 2:

Figure 1 illustrates an edgewise view of the invention, the several layers or coatings of which the film is composed being shown as separated from each other, so that the construction may be more clearly presented. Fig. 2 illustrates a view of the back side of the film, showing the numerals and other designations thereon and the opaque or non-actinic terminal pieces for the protection of the film against the action of light when rolled up.

A is a strip or sheet of suitable transparent and flexible material. Its function is to act as a support for the sensitive material B, which may be any of the well-known emulsions or coatings now in use. Before the sensitive material is applied to the support A, I apply upon the back thereof a coating or layer C, of any suitable soluble material, which I treat with suitable coloring-matter to render it opaque or non-actinic. Many such are now well known. After the soluble coating has been applied and has dried or partially dried I produce upon the back thereof numerals D (see Fig. 2) to indicate the exposures and also designations or marks E to indicate the points at which to cross-cut the film after exposure to separate the several pictures or negatives. These numerals and markings may be produced upon the back of the soluble coating in a variety of ways—as, for instance, by printing, stenciling, or by hand, or separate pasters of thin paper or the like may be attached either separately or in the form of a continuous tape or ribbon.

The new film illustrated in Fig. 1, except, of course, that its three elements—*i. e.*, the support A, the sensitized surface B, and the colored backing C—are all attached together, forming an integral structure, may be of such length and size as preferred, depending on the number of exposures desired.

To protect the film when rolled up from the injurious action of light, I ordinarily attach to each of its ends a terminal strip or piece of opaque or non-actinic material, (ordinary black paper attached to the film by suitable adhesive material may be used,) said terminal strips being of sufficient length to wrap several times about the film when it is coiled upon a spool or otherwise.

The operation is as follows: During the exposure of the film in the camera the soluble colored backing layer or coating protects the sensitive material against the action of light which may penetrate through the peep-hole in the camera; but after exposure it may be dissolved and washed away with water or other suitable solvent in the dark room, leaving the film, or rather the negatives, clear and transparent for printing therefrom, and in some instances, depending on the kind and character of the coloring material and the developing and fixing fluids, the soluble covering will be removed without the necessity for separating washing.

It will be obvious to those who are skilled in this art that the sensitive and the colored coatings may be applied to the support, layer, or sheet in a variety of ways. Therefore no specific description thereof is necessary, and also that modifications may be made in the details of manufacture of my product. I therefore do not limit myself to the details described.

I claim—

1. A flexible photographic film embodying a suitable flexible support, a protective coating of soluble and colored material applied to one side of the support and a coating of sensitive material applied to the opposite side thereof.

2. A flexible photographic film embodying a suitable flexible support, a protective coating of soluble and colored material applied to one side of the support and a coating of sensitive material applied to the opposite side and designations of the kind stated upon the back of the soluble colored coating.

3. A flexible photographic film embodying a suitable flexible support, a protective coating of soluble and colored material applied to one side of the support, a coating of sensitive material applied to the other side of the support, designations of the kind stated upon the back of the soluble, colored coating and pieces
5 of opaque or light-excluding material attached at the ends of the film to protect it against the action of light when rolled up.

In testimony whereof I have signed my name to this specification in the presence of two subscribing witnesses.

FREDERICK A. ANTHONY.

Witnesses:
 R. A. ANTHONY,
 EDNA L. SPENCER.